UNITED STATES PATENT OFFICE.

ARTHUR ARENT, OF DES MOINES, IOWA.

PROTECTIVE MATERIAL.

1,388,827.   Specification of Letters Patent.   Patented Aug. 23, 1921.

No Drawing.   Application filed January 29, 1921.  Serial No. 441,081.

*To all whom it may concern:*

Be it known that I, ARTHUR ARENT, a citizen of the United States, residing at Des Moines, in the county of Polk and State of Iowa, have invented certain new and useful Improvements in Protective Materials; and I do hereby declare the following to be a full, clear, and exact description of the invention, such as will enable others skilled in the art to which it appertains to make and use the same.

This invention relates to protective materials for the purpose of preserving and waterproofing articles and rendering them relatively non-inflammable. More particularly, the invention relates to compositions for waterproofing and fireproofing fibrous materials such as canvas, duck, and other textile fabrics, and especially cloth used for aeroplane wings, hangar tents, balloons, etc.

Briefly stated, the invention comprises, broadly, protective compositions comprising as an ingredient thereof a compound of a metal, ordinarily a fire-retardant metallic salt, most desirably in substantially anhydrous condition and capable, upon suitable subsequent treatment or exposure, of yielding an oxid or a basic salt which is practically insoluble in water, said oxid or basic salt being also fire-retardant and rendering the material to which it is applied non-inflammable or decreasing its inflammability, depending upon the particular procedure followed and the results sought. In conjunction with said metal compound it is also desirable to employ a waterproofing agent where a composition is required that will waterproof as well as fire-proof. Most desirably the waterproofing agent and the metallic salt are associated together in the form of a solution comprising said waterproofing agent and metallic salt dissolved in a suitable menstruum which may either be a common solvent for both said ingredients, or a mixture of solvents, accompanied or not by other ingredients suitable for the particular object in view.

In its most desirable practical embodiments, the invention of the present application thus comprises novel compositions of matter in the nature of combined waterproofing and fireproofing mixtures useful in carrying out the method described and claimed in my prior copending application, Serial No. 254,958, filed September 20, 1918, of which the present application is a division for the most part.

In order to afford a complete understanding of the principles of the invention, typical embodiments thereof will be hereinafter set forth in detail; but it is to be understood that the invention in its broader aspects is not limited to such details.

In accordance with the best mode of practising the invention now known to me, the metallic salt to be used for fireproofing purposes is dissolved in a non-aqueous solvent in which said salt is soluble. By non-aqueous solvent is here meant a solvent which is composed wholly or largely of a liquid other than water. If water is present at all in such solvent, it should be present in proportions insufficient to cause substantial hydrolyzation or decomposition of the salt employed and consequent deposition of an insoluble oxid or basic salt. Generally speaking, metallic salts suitable for use in the present process are those which upon treatment with $H_2O$, either in the form of liquid, vapor, or steam are decomposed and yield a substantially water-insoluble oxid or basic salt, such as an oxysalt. Antimony salts are especially adapted for use in the present process and are preferred herein, and where an antimony salt is used, antimony trichlorid is especially desirable.

In preparing a typical composition or "dope" within the scope of the invention, useful in treating aeroplane wings for example, I prepare a saturated solution of antimony trichlorid in a volatile carbon chlorid solvent, carbon tetrachlorid offering special advantages for this purpose and being usually employed in practice. Chloroform is also an excellent solvent for this purpose, but is more expensive and less safe to handle. If the material to be fireproofed is also to be waterproofed, a waterproofing agent is most desirably incorporated in the solution in commixture with the antimony salt. The particular waterproofing agent to be used depends upon the character of the material to be treated and the purposes for which it is intended. In general a vulcanizable gum of the caoutchouc type is suitable; but for some classes of work, especially aeroplane work, gutta percha offers distinct advantages and is much to be preferred. Among other things, the presence of the gutta percha gives the coating solution a brownish tinge which is desirable in that it apparently aids to a certain extent in protecting the underlying coating of cellulose ester, with which aeroplane wings are commonly provided, from the destructive action of certain actinic light rays. Gutta percha, especially in sheet or tissue form is readily soluble in carbon tetrachlorid and it is taken up readily by carbon tetrachlorid saturated with antimony chlorid; so that in this instance a single solvent serves admirably in preparing a mixed solution of gutta percha and antimony trichlorid. It is to be understood that the gutta percha may also be used in chip or other form. The amount of water-proofing agent employed, specifically gutta percha in this instance, may vary widely, but in practice I have found from one to two ounces of gutta percha per pound of tetrachlorid to give good results. To some extent, the amount of gutta percha used will be determined by the desired consistency of the mixture. The mixture should be fluent enough to spread well under the brush, if it is to be applied by brush; and similarly, where it is applied by other methods, such as spraying, dipping, etc., the proportions in which the gutta percha may be employed to advantage will be governed partly by well known practical considerations involved in such methods.

Assuming, for example, that untreated cloth or other fibrous material is to be protected, the mixture thus prepared may be applied to the cloth or other fibrous material in any desired manner, as by brushing on, for example. After the mixture has been applied to the cloth, the volatile solvent is removed either by allowing it to evaporate spontaneously or by a special drying treatment, recovery of the solvent by any well known or suitable method being ordinarily desirable. After evaporation of the solvent, the cloth may be subjected to the hydrolyzing action of moisture. A convenient way to effect this is to immerse the cloth in water for a suitable period of time which may vary according to the nature and consistency of the mixture or "dope" used. Ordinarily an immersion of from 10 to 30 minutes suffices in actual practice. As a result of this treatment more or less of the antimony trichlorid undergoes hydrolyzation, especially at the surface of the coating, with the formation of basic chlorids or oxysalts, the decomposition probably going even to the oxid to some extent. These basic salts and the oxid or oxids thus formed are substantially insoluble in water, they adhere tenaciously to the article whether accompanied by a water-proofing agent or not, and especially when such agent is used, and they, as well as whatever portion of the antimony chlorid that persists unchanged, are excellent fire retardants. Furthermore, if the cloth is subsequently exposed to weather in actual use, as is the case with canvas or duck for tents, hangars, etc., the formation of these basic salts and oxids in the coating or impregnating substance may be more or less progressive, assuming that the decomposition of the antimony trichlorid occurred principally in the outer and exposed surfaces of the fabric as a result of the first treatment with water. Irrespective of whether much oxidation does actually occur or not, it is a fact that fabric treated as described is rendered non-inflammable; and my invention is therefore based on the observed facts rather than upon any theory as to exactly what chemical change, if any, is undergone by the antimony chlorid. In cases where the use of steam is feasible, the evaporation of the solvent and the decomposition of the antimony trichlorid can be effected simultaneously, the recovery of the solvent being also readily carried out by known methods. Or circulation of warm moist air in contact with the treated cloth may be resorted to.

A highly important practical application of the invention is in connection with aeroplane manufacture. In making areoplanes according to the practice heretofore prevailing, the linen or cotton cloth used for the wings is carefully stretched on the wing frames and is then treated in place with a shrinking agent to obtain maximum tautness; and this shrinking agent is usually cellulose acetate or other suitable cellulose ester, in the form of a varnish-like solution, of which several coats are applied, ordinarily three. After this treatment, the taut cloth is then given a final protective coating of high grade aeroplane varnish, such as an outside spar varnish of the best quality. Both the cellulose ester and the varnish employed, as well as the cloth itself, if untreated, are very inflammable; and even when the cloth has been treated with a fireproofing or fire-retarding agent, the combination nevertheless burns quite freely owing to the high combustibility of the coating materials employed. It has also been proposed to mix a fire-retarding filler, such as ocher or the like, with the varnish; but even this has failed to prevent relatively high inflammability of the treated cloth, and the addition of a heavy inert filler such as ocher has the further advantage of unduly increasing the weight. In one mode of utilizing practical compositions of the character involved in the present invention, the final exterior coat of ordinary spar varnish heretofore employed on the aeroplane wings is replaced by a coating of varnish-like material which comprises as an essential ingredient a metallic salt of the character hereinbefore described, antimony trichlorid in this specific instance, said coating usually being subsequently treated to develop more fully its fireproofing capabilities. The best mode of effecting this is to mix with the carbon tetrachlorid solution of antimony trichlorid and gutta percha previously described, about an equal volume of good outside spar varnish, although it is to be understood that the proportions may be varied. This mixture is then brushed on to the cloth which has previously been treated with cellulose acetate. By proceeding in this manner, even where the cloth itself has not been treated with a fire-retardant, the inflammability of the shrunk and varnished cloth is very much less than that of aeroplane wing cloth treated according to methods heretofore known. It is to be noted that, in this case, the fire-retarding effect is due practically exclusively to an exterior protecting layer on the fabric as distinguished from impregnation of the fabric itself, showing that the hereindescribed novel compositions may be employed to protectively coat bodies or objects which are not necessarily fibrous or absorbent. Most desirably, however, in treating aeroplane wings with a composition of the type here involved, the cloth itself is also preliminarily treated directly with a fireproofing agent or fire-retardant prior to coating it with cellulose acetate. The invention is not limited in its broader aspects to the employment of any particular fire-retardant for this purpose but impregnation of the cloth with a carbon tetrachlorid solution of antimony trichlorid, followed by treatment with moisture, is very effective in rendering the cloth non-inflammable.

In some cases it is advisable to entirely omit the spar varnish and to employ as the final exterior coating for the wing cloth simply the solution of gutta percha and antimony trichlorid.

While a mixture comprising both gutta percha and a spar varnish, in company with antimony trichlorid has been found of particular value, the invention in its broader aspects extends to similar mixtures not including gutta percha or rubber, but comprising varnish gums or resins, cellulose esters, or the like, which may be generically designated varnish bases.

Among other non-aqueous solvents capable of employment in some cases for preparing novel compositions within the broad scope of my invention may be mentioned amyl acetate, acetone, alcohol (ethyl or methyl), linseed oil and other drying oils, benzol, etc. The use of certain of such solvents, among others, is disclosed in my prior copending applications Ser. No. 275,242, filed Feb. 5, 1919, and Ser. No. 387,733 filed June 9, 1920. It is to be understood that the liquid mixture itself need not be non-inflammable, but that the dried coating obtained by use of such mixture is non-inflammable when the invention is practised to the best advantage.

What I claim is:

1. As a new composition of matter for fireproofing and like purposes, a solution of antimony trichlorid in carbon tetrachlorid.

2. As a new composition of matter for fireproofing and like purposes, a solution of antimony trichlorid in a carbon chlorid solvent.

3. As a new composition of matter for fireproofing and like purposes, a solution of a gum and a fire-retardant antimony salt in a solvent for both, said antimony salt being present in proportion sufficient to render non-inflammable a dried coating produced by said composition.

4. As a new composition of matter for fireproofing and like purposes, a solution of a gum and a fire-retardant antimony salt in a carbon chlorid solvent for both, said antimony salt being present in proportion sufficient to render non-inflammable a dried coating produced by said composition.

5. As a new composition of matter for fireproofing and like purposes, a mixture of a varnish base and a fire-retardant antimony salt in a non-aqueous menstruum, said antimony salt being present in proportion sufficient to render non-inflammable a dried coating produced by said composition.

6. As a new composition of matter for fireproofing and like purposes, a mixture of a varnish gum and antimony trichlorid in a non-aqueous menstruum, said antimony trichlorid being present in proportion sufficient to render non-inflammable a dried coating produced by said composition.

7. As a new composition of matter for fireproofing and like purposes, a varnish containing a fire-retardant antimony salt in proportion sufficient to produce a non-inflammable varnish coating.

8. As a new composition of matter for fireproofing and like purposes, a varnish containing antimony trichlorid, in proportion sufficient to produce a non-inflammable varnish coating.

9. As a new composition of matter, a varnish containing a fire-retardant hydrolyzable metal salt in proportion sufficient to produce a non-inflammable varnish coating.

10. As a new composition of matter for fireproofing and like purposes, a waterproofing and fire-retardant composition comprising a rubber gum, a varnish gum, and a fire-retardant hydrolyzable compound of a metal, dissolved in a solvent menstruum.

11. As a new composition of matter for fireproofing and like purposes, a composition comprising a rubber gum and a fire-retardant hydrolyzable compound of a metal, dissolved in a solvent menstruum.

12. As a new composition of matter for fireproofing and like purposes, a composition comprising gutta percha and a hydrolyzable compound of a metal, dissolved in a solvent menstruum.

13. As a new composition of matter for fireproofing and like purposes, a waterproofing and fire-retardant composition resulting from the commixture of a spar varnish with gutta percha and antimony trichlorid mixed in carbon tetrachlorid.

14. As a new composition of matter, a mixture of antimony trichlorid and a waterproofing agent.

15. As a new composition of matter, a mixture containing a varnish and a dissolved metallic compound capable of forming a precipitate on contact with water, said compound being present in quantity sufficient to render substantially non-inflammable a coating produced by said mixture.

In testimony whereof I hereunto affix my signature.

ARTHUR ARENT.